R. H. BLACK.
PIPE INSULATION FORM AND CASE.
APPLICATION FILED JUNE 25, 1919.
1,320,975.
Patented Nov. 4, 1919.
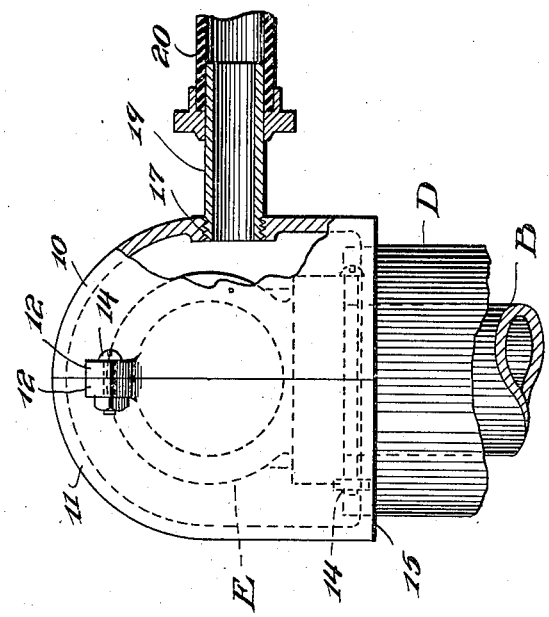
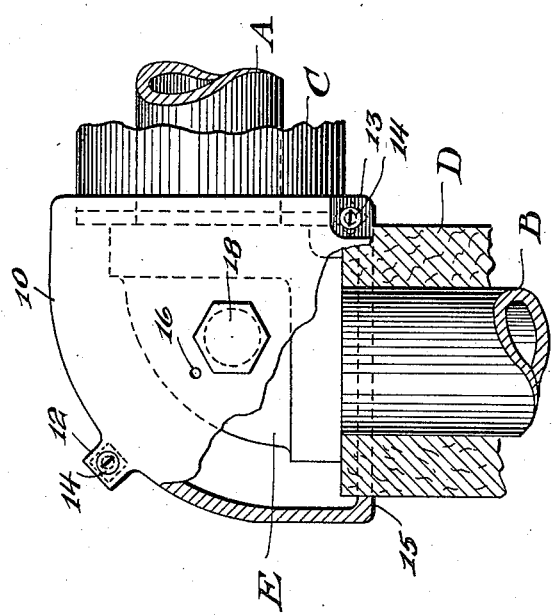
WITNESS
Wynne Johnson
INVENTOR
R. H. Black
BY
ATTORNEYS

UNITED STATES PATENT OFFICE.

ROY HERBERT BLACK, OF TULSA, OKLAHOMA.

PIPE-INSULATION FORM AND CASE.

1,320,975.  Specification of Letters Patent.  Patented Nov. 4, 1919.

Application filed June 25, 1919. Serial No. 306,622.

*To all whom it may concern:*

Be it known that I, ROY HERBERT BLACK, a citizen of the United States, residing at Tulsa, in the county of Tulsa and State of Oklahoma, have invented new and useful Improvements in Pipe-Insulation Forms and Cases, of which the following is a specification.

This invention relates to means for protecting the fittings used on steam, vapor, oil, water, or other pipe lines where fittings require insulation and protection, and has for its object the provision of a separable case adapted to be engaged upon the ends of pipe coverings adjacent a fitting, this case being adapted to be filled with and serve as a mold for an insulating material such as a paste formed of asbestos and water, the case being removable if desired, though being primarily designed to remain upon and protect the insulation thus formed.

An important object is the provision of a device of this character which will be simple and inexpensive in manufacture and use, highly efficient and durable in service, and a general improvement in the art.

With the above and other objects and advantages in view, the invention consists in the details of construction to be hereinafter more fully described and claimed, and illustrated in the accompanying drawings, in which—

Figure 1 is a side elevation of my device, partly in section, showing it engaged upon the ends of pipe covering adjacent an elbow, and Fig. 2 is a rear end elevation thereof with a portion broken away and in section, and showing associated therewith means whereby to permit the injection of the plastic material.

Referring more particularly to the drawings, the letters A and B designate pipes about which are disposed protecting members C and D, respectively, and E designates an elbow connecting the pipe, and which is is desired to cover with insulating material such as a paste formed of asbestos and water which is commonly used.

In carrying out my invention I provide a combined mold and casing comprising a pair of similar members 10 and 11 which have the same contour as the elbow E and which have formed thereon lugs 12 and 13, through which are passed bolts 14 for clamping the sections 10 and 11 together. At their ends, the sections 10 and 11 are provided with inwardly extending flanges 15 which engage against the outer peripheries of the pipe coverings C and D to form a tight joint. One casing section is provided with a small drilled hole for a purpose to be described and is also provided with a threaded hole 17 normally closed by a plug 18 but into which may be inserted a nipple 19 for a purpose to be described.

The sections 10 and 11 being in position, as shown and described, the nipple 19 is inserted within the threaded hole 17 and some suitable power device, such as that shown and described in my companion application, filed June 25, 1919, Serial Number 306,623, is attached to the nipple, as by means of a flexible hose 20, whereby a paste of suitable material, such as asbestos and water, may be forced into the casing and mold so as to fill the space between the elbow E and casing, and it is requisite that this paste be injected with sufficient pressure to prevent the formation of air channels or bubbles within the mass in the casing. The small hole 16 provides means for the egress of air within the casing as the paste is forced in and this small hole also serves as means for apprising the operator of the fact that the casing is full of the paste. After the casing is thus filled the nipple 19 is removed and the plug 18 screwed into the hole 17. It is designed that the casing should remain permanently associated with the pipe covers C and D and form a protection for the insulating material disposed about the elbow.

While I have shown and described my device as associated with an elbow, it should be strictly understood that this is illustrative and that my invention is designed for use in connection with pipe fittings of any kind without restrictions, as it is merely necessary that the shape of the casing be modified to suit the contours of the different fittings.

Having thus described my invention, I claim:—

1. A combined casing and mold for pipe fittings comprising a pair of similar casing sections adapted for disposition about a pipe fitting and provided at their ends with inwardly directed flanges adapted for clamping engagement upon the peripheries of protective coverings disposed about the pipe adjacent the fitting, lugs formed on said sections, clamping bolts passing through said lugs, one of said sections being provided with an air hole and being also provided with an entrance hole adapted to have injected therein plastic insulating material.

2. A mold and casing for pipe fittings comprising a casing member disposable about a pipe fitting in clamping engagement upon the ends of protective coverings about the pipes connected with the fitting, said casing member being provided with an air hole and being further provided with an entrance hole adapted to permit the injection into said casing member of an insulating paste, and a plug normally closing said entrance hole.

ROY HERBERT BLACK.

Copies of this patent may be obtained for five cents each, by addressing the "Commissioner of Patents, Washington, D. C."